United States Patent
Vincent et al.

[15] 3,700,017
[45] Oct. 24, 1972

[54] CITRUS FRUIT PEELING MACHINE

[72] Inventors: Daniel B. Vincent; Daniel A. Vincent; George C. Roberts, all of Tampa, Fla.

[73] Assignee: Consolidated Machines, Inc., Tampa, Fla.

[22] Filed: Aug. 5, 1970

[21] Appl. No.: 61,048

[52] U.S. Cl..................................146/3 M, 146/43 R
[51] Int. Cl. .............................................A23m 7/00
[58] Field of Search............................146/3 M, 43 R

[56] References Cited

UNITED STATES PATENTS

| | | | |
|---|---|---|---|
| 2,286,649 | 6/1942 | Rogers | 146/43 R |
| 1,469,650 | 10/1923 | Sletto | 146/43 R |
| 1,553,630 | 9/1925 | Polk | 146/43 R |
| 2,299,761 | 10/1942 | McCauley | 146/43 R |
| 3,352,337 | 11/1967 | Vadas | 146/43 R X |

*Primary Examiner*—Willie G. Abercrombie
*Attorney*—Cushman, Darby & Cushman

[57] ABSTRACT

By preference the device includes two substantially alike sections which accept two unpeeled fruit and swing them into peeling position. Here, the fruits are each accepted by opposed spike chucks which are initially sharply thrust into the peel, followed by some relaxation. As the fruit is rotated on the chucks, two knives move across the rotating fruit to an adjustable depth cutting peel therefrom toward the spikes. The edges of two additional knives finally pass under the spikes to cut the ball of fruit from the peel buttons held by the spikes. Plungers push the buttons from the spikes and the fruit balls and peel buttons fall to a conveyor for mechanical separation.

10 Claims, 14 Drawing Figures

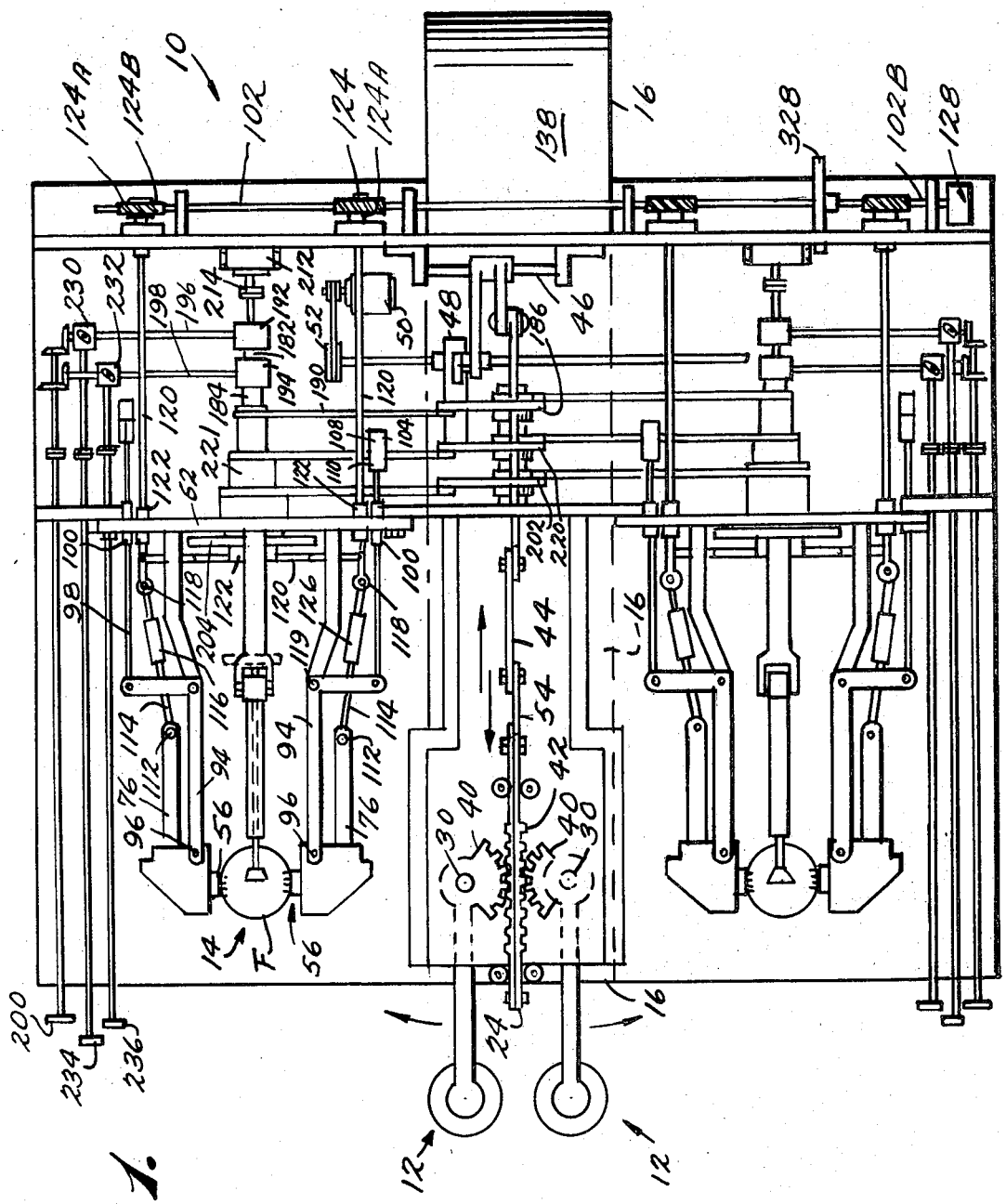

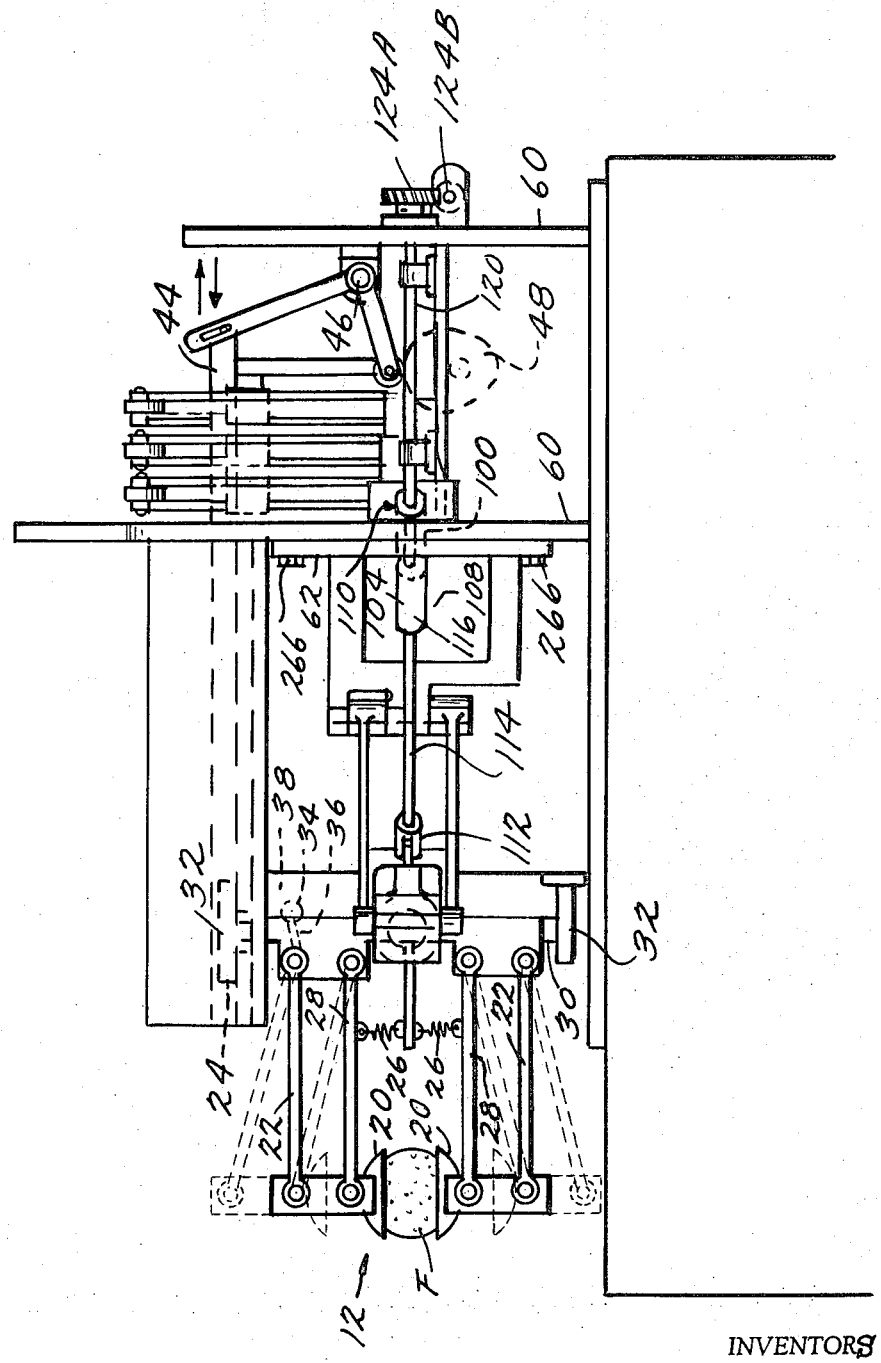

PATENTED OCT 24 1972 3,700,017

INVENTORS
DANIEL B. VINCENT
DANIEL A. VINCENT
GEORGE C. ROBERT
BY Cushman Darby Cushman
ATTORNEYS INVENTORS
DANIEL B. VINCENT
DANIEL A. VINCENT
GEORGE C. ROBERTS
BY Cushman, Darby & Cushman
ATTORNEYS

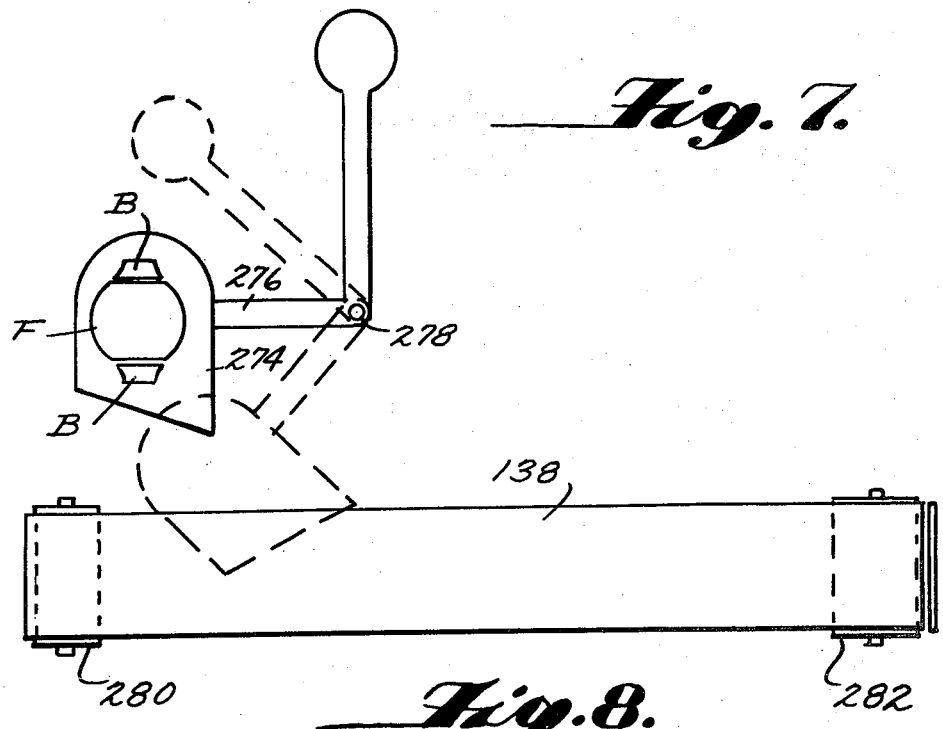

INVENTORS
DANIEL B. VINCENT
DANIEL A. VINCENT
GEORGE C. ROBERTS
BY Cushman, Darby & Cushman
ATTORNEYS

CITRUS FRUIT PEELING MACHINE

BACKGROUND OF THE INVENTION

One method to prepare citrus fruit for the market is to remove the peel and then remove the individual segments with a knife. These segments are then packed in their own juice in cans and sterilized or in sterilized glass jars and chilled for commercial distribution, or they may be frozen.

Two methods are now commercially used to remove the peel — one being to slice off the peel by hand with a sharp knife; the other, to heat the fruit in a steam chamber, usually on a belt moving through a long tunnel, until the peel becomes soft and separates from the fruit ball. The peel of grapefruit can then be stripped off like peeling a banana; oranges generally are not susceptible to this method. After the grapefruit has been peeled by the steam method, the ball of peeled fruit is then passed through a bath of a hot caustic solution to soften and dissolve that part of the thin integument membrane surrounding the outer periphery of the ball so that the segments of fruit can be removed by inserting a knife like instrument to separate each segment from the integument walls between the segments. Obviously this heating and caustic treatment imparts a scorched flavor to the fruit segments. Therefore, the hand peeled method is much preferred by the consuming public. Also, this method is generally used for oranges.

Unfortunately, processing of fruit by the hand peeled method is more expensive than the hot peeled method because of the time it takes the operator to strip off slices of peel with a knife and the waste caused by the operators cutting too deep into the fruit in their haste to peel as much fruit as possible since they are paid on a piece production basis.

Oranges and grapefruit are of generally the same construction. The orange is usually much smaller and the peel much thinner than that of grapefruit. Both, however, are somewhat uniform in configuration, but thickness of peel varies in individual pieces of fruit and in different places on the same piece of fruit.

Oranges and grapefruit have a stem end and a bud end opposite one another and at opposite ends of the core about which the fruit segments are clustered with apices presented toward the core. Generally each fruit has twelve segments. Starting at the outside of the fruit (using a seeded variety of grapefruit as an example) the fruit in cross section can be seen to have a pigmented thin layer (the flavedo) containing the peel oil cells, than a white, spongy covering (the albedo) which varies in thickness at different places on the fruit. Within the jacket (peel formed by the flavedo and albedo) lie the segments which are composed of pulp cells (juice sacs) adhered together and each completely surrounded with a thin, tough plastic film (the integument). The integument for each segment thus consists of two side walls which confront other segments and an outer wall which adjoins the albedo. In seeded varieties, seeds are embedded in the apex area of each segment and within the integument.

The ideally peeled fruit has the peel and the integument outer walls entirely removed and as little as possible of the pulp cells (juice sacs) removed.

To remove the peel mechanically with as little waste as possible, it is therefore necessary that the cutting instrument be free to move rapidly, easily and with little resistance to follow rapidly the configuration of the individual fruit being peeled. At the same time, the knife should cut completely through the peel and the thin integument membrane just under it, removing as little as possible any part of the fruit cells, and leaving a clean cut smooth surface on the ball of finished fruit.

SUMMARY OF THE INVENTION

The invention provides ways and means for mechanically severing the peel (including the flavedo, the albedo and the segments' integument outer walls) from the fruit while removing little of the pulp cells (juice sacs) from the peeled fruit balls.

To accomplish this, the machine by preference includes two substantially alike sections which accept two unpeeled fruit and swing them into peeling position. Here, the fruits are each accepted by opposed spike chucks which are initially sharply thrust into the peel, followed by some relaxation. As the fruit is rotated on two chucks, two knives move across the rotating fruit to an adjustable depth cutting peel therefrom toward the spikes. The edges of two additional knives finally pass under the spikes to cut the ball of fruit from the peel buttons held by the spikes. Plungers push the buttons from the spikes and the fruit balls and peel buttons fall to a conveyor for mechanical separation.

The principles of the invention will be further hereinafter discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the drawings:

FIG. 1 is a top plan view in diagrammatic form of a peeling machine constructed in accordance with the principles of the invention;

FIG. 2 is a side elevation view of one fruit accepting station of the machine of FIG. 1;

FIG. 7 is a diagrammatic top plan view of the peeling station at a stage where the peeling has been completed, the spiked peel buttons having been severed from the peeled fruit ball, the buttons and ball are about to be dropped onto a conveyor belt; and FIG. 8 is a diagrammatic side elevation view generally corresponding to FIG. 7 and showing the peeled fruit balls being separated from the severed peel buttons on the conveyor belt;

DESCRIPTION OF THE PRESENTLY PREFERRED EMBODIMENT

Figure 9:
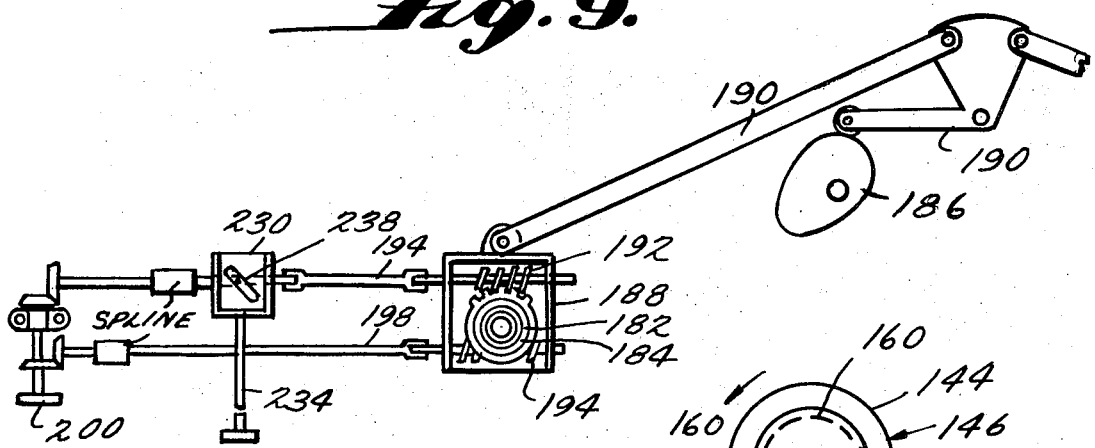
FIG. 9 is a front elevation view of one side of the cutting depth setting unit.

With particular reference to FIG. 1, the fruit peeling machine 10 preferably includes two fruit accepting stations 12 arranged to supply fruit to two fruit peeling stations 14 which in turn both feed a common conveyor 16 for peeled fruit balls and severed peelings. The machine 10 could be provided with but one fruit accepting station and one fruit peeling station severing the conveyor (and this would lie within the purview of the invention), but it has been found that one average woman operator positioned behind the machine can serve a double-head machine 10 as well as a single-head machine of otherwise the same construction. (In a double-head machine, the operator simultaneously feeds one fruit with each hand to the fruit accepting stations.) It is considered possible to feed the fruit accepting stations by mechanical means, e.g. conveyors, rather than by hand, but at present fruit orientation and machine supervision which can presently be most economically and reliably provided by a human operator is preferred.

One side of the machine will be described below as an example of both sides thereof.

Each fruit accepting station 12 (FIG. 2) comprises a vertically opposed pair of cup elements 20 carried on respective arm assemblies 22 hinged in parallelogram linkage fashion which permits the cups to be moved toward and away from one another while remaining vertically aligned. The two arm assemblies are coordinated by a rack gear mechanism 24 which can be easily seen to cause corresponding movements of the two cup elements toward and away from one another. A spring 26 secured between the upper and lower arm assemblies 22 tends to urge the cups toward one another in a sense to clamp between them a fruit F deposited by the operator upon the lower one of the cups at the fruit accepting station. However, the parallelogram arm linkages 22 have respective inner arms 28 mounted one above the other on a vertical axle 30 journalled in bearings 32 for rotation about its own longitudinal axis. When the axle 30 is angularly oriented to present the cups for acceptance of a fruit to be peeled a cam roller 34, secured via an extension 36 to one of the parallelogram arm linkages (securement to the upper link of the upper linkage is depicted) is engaged by a high region of a cam surface 38 stationarily provided on the machine. This deflects the upper, lower and outer links of the upper linkage 22 downwardly by a corresponding amount, against tensioning force provided by the spring 26.

The axle 30 is shown provided with a gear 40 which meshes with a rack 42 in turn secured to a rod 44 mounted for reciprocation along its own longitudinal axis. In the instance depicted, reciprocation of the rod 44 is effected by a stub axle 46 connection of the rod 44 to an eccentric cam 48 rotated by an electric motor 50 through a timing linkage 52. Thus in operation of the fruit accepting station, the cups 20 are brought near the machine operator and spread apart for acceptance of a fruit to be peeled. As the axle 30 begins to be rotated 90° to the peeling station the roller 34 runs down the surface 38 allowing the spring 26 to clamp the cups 20 against the fruit F. Screw thread and nut arrangements 54 permit initial adjustment of the racks for the two sections of the machine and for both of them with respect to the arm in order to insure coordinate angular movement by the desired amount to present the fruits F for engagement by spike chucks in the peeling station.

Once at the peeling station 14 the fruit F is engaged at diametrically opposed points by two spiked chucks 56 which are forcefully thrust into the fruit until stop-plates 56 on each spike chuck engage the exterior of the fruit F. Due to the shape of the cam surface 38, the roller 34 has run back to a low spot after rotation of the axle 30 to its second extreme where the fruit F is in position to be spiked upon initiation of return of the axle 30 to its first extreme.

The machine 10 includes a frame 60 shown including a plate 62 having an opening 64 fitted with a tubular sleeve bearing 66.

Each spike chuck includes a plurality of generally parallel, pointed spikes 68 perpendicularly mounted in a hollow ring on a face of the plate 56. The spikes are each a little longer than the peel of the fruit to be processed on the machine is thick. The opposite face of each plate 56 from the spikes 68 securement is centrally mounted on the end of a tubular shaft 70 which at its opposite end mounts a gear 72 which meshes at right angles with a gear 74. A shaft 76 mounts the gear 74 at one shaft end.

Within the ring of spikes 68, the spike carrying face of the plate 56 is recessed at 78 to accommodate the head of a plunger 80. A shaft 82 is centrally fixed to the back of the plunger and extends axially through the tubular shaft 70 and through an opening through the center of the gear 72. (There is no driving connection between the shaft 82 and the gear 72.)

The gears 72 and 74 are enclosed within a housing 84 which includes sleeve bearings 86, 88 and 90 for support and exit of shafts 70, 76 and 82, respectively, with respect to the housing. The housing 84 exteriorly includes an ear 92 to which one end of an angulated arm 94 is pivoted at 96. The opposite end of the arm 94 is pivoted at 118 and 119 to a link 98 which proceeds through a tubular sleeve 100 in the plate 62 to connection with an air cylinder 104 for reciprocating the link 98. It should be noticed that the link 98 incorporates a cylinder 104 which receives a piston 106 (FIG. 2).

Accordingly, when the air cylinder 104 forces the link 98 forwardly, the spike chucks 56 are forcibly, rapidly driven into the fruit held by the fruit cups 20 at the fruit peeling station. The spikes are driven in with such force that they fully pierce the peel and the stop plates 56 engage the fruit. Then, air is released from the piston chamber 104 through the bleed 108 to allow the fruit if it has been compressed by being simultaneously hit by spike chucks from opposite sides, to relax and cause the shafts 70 bearing the spike chucks to retreat sufficiently to accommodate the recovery of the fruit.

This action ensures a firm hold on the spikes, for spinning the fruit during peeling, just as if it were on a lathe; without damaging the interior of the fruit. If no relaxation were provided for, the spike chucks could twist plugs out of the fruit during the peeling operation and thus lose their ability to turn the fruit.

Compressed air for eventual recovery of the bled cylinder 104 is provided through the line 110 at a later state.

The shaft 76 is articulated at 112 to a link 114 which incorporates a splined slip joint 116. The other end of the link 114 is articulated at 118 to a shaft 120, which proceeds through a sleeve 122 in the plate 62. Behind the plate 62, a worm gear 124-A is mounted on the shaft 120. On shaft 102 are mounted worm pinions 124-B in communication with gears 124-A and a friction clutch 328 which in turn is connected by shaft 102-B to motor 128 for rotating the fruit F at a desired speed. Clutch 328 is opened and closed by an electric switch actuated by cam action to start fruit rotation as soon as the spikes 68 are in place and stop rotation when the knobs are cut off. The motor 128 may conveniently be an air motor controllable at the face of the machine by the machine operator. To give an example, the speed of rotation of a grapefruit of 5 inches, diameter, being peeled on the machine 10 is about 525 R.P.M.

Rotation of the spike chuck linkage begins as soon as the fruit cups 20 have released the fruit to the spikes and moved back toward the fruit accepting station.

After the fruit is peeled as described below, the shafts 70 continue to rotate as the sharp edges 132 of knives 134 pass across each end of the rotating fruit just past the points of the spikes, and sever the ball of peeled fruit from the buttons B of peel held on the spikes. The knives 134 are actuated by air motors 136.

The fruit from which the buttons B have been severed falls onto a moving, endless rubber belt 138 and is carried from the machine. The plungers 80 positioned in the center of the spike chucks are forced outwardly to force the buttons of peel off of the spikes. This action takes place when arms 94 are withdrawn, causing pins 82 to strike obstructions 140 that are fastened to the frame of the machine. The buttons of peel fall from the spikes onto the belt conveyor 138 carrying the ball of peeled fruit. A small rod 142 is positioned across the belt 138 just high enough over the belt to permit the buttons of peel to pass under it and out of the machine while the fruit slides over it and out of the machine, where the fruit and buttons fall into separate receptacles.

Figure 3:
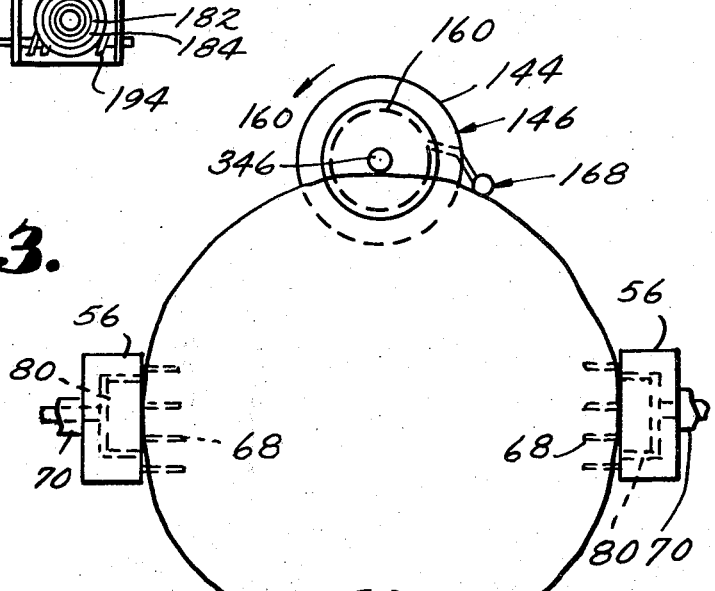
FIG. 3 is a front elevation view of one fruit peeling station of the machine of FIG. 1 at the beginning of the peeling cycle.
Figure 4:
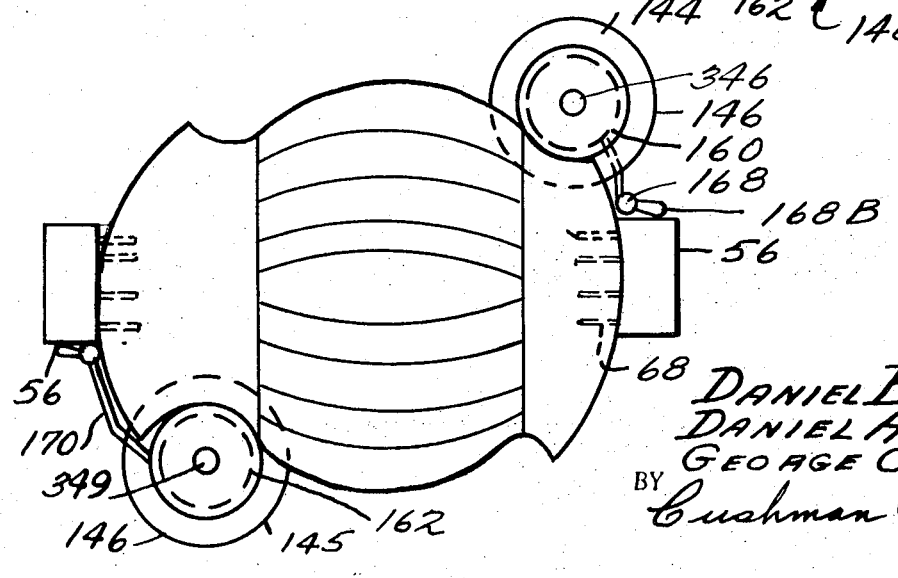
FIG. 4 is a front elevation view of the fruit peeling station of the machine of FIG. 1 near the end of the peeling cycle.
Figure 5:
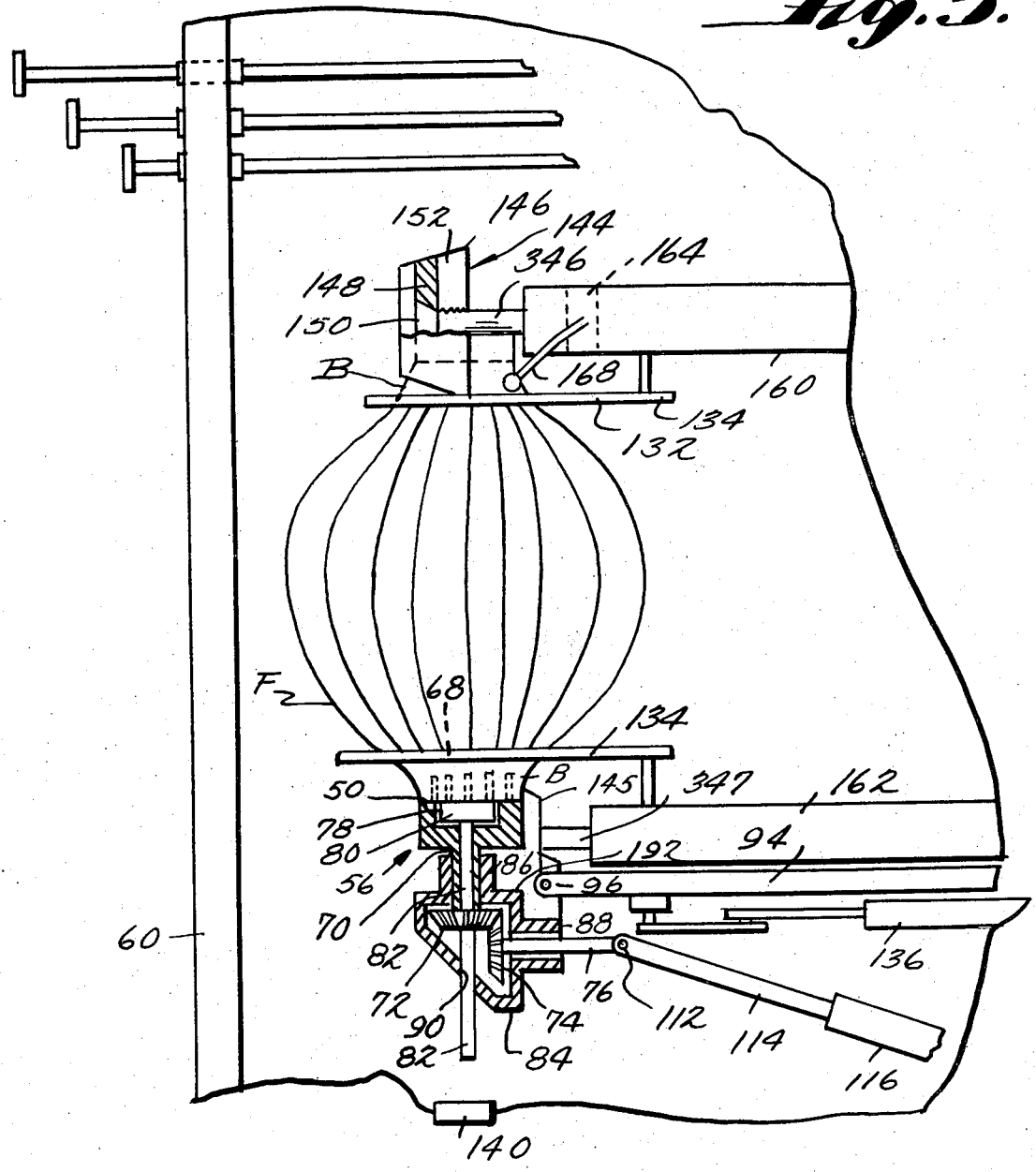
FIG. 5 is a top plan view of the fruit peeling station of the machine of FIG. 1.
Figure 6:
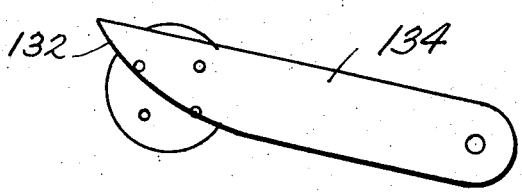
FIG. 6 is a side elevation view of one of the peel button severing knives.
Figure 10:
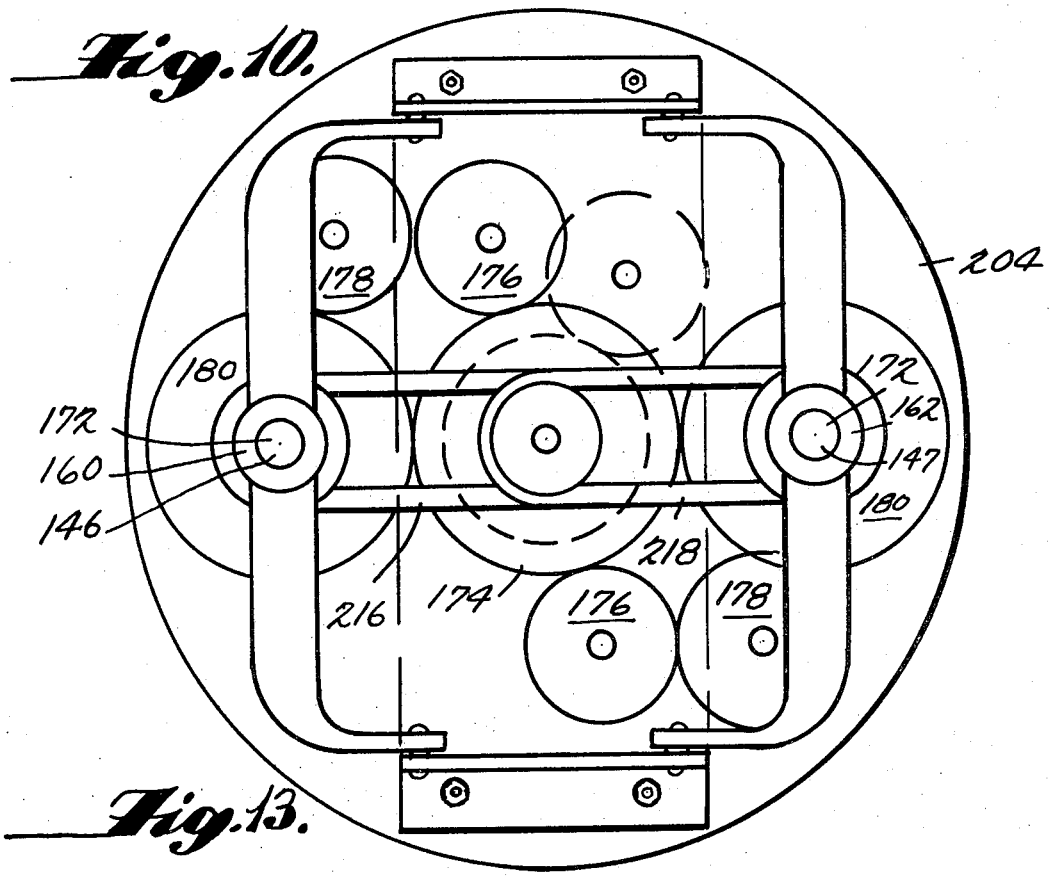
FIG. 10 is a front elevation view of one of the removable heads.
Figure 13:
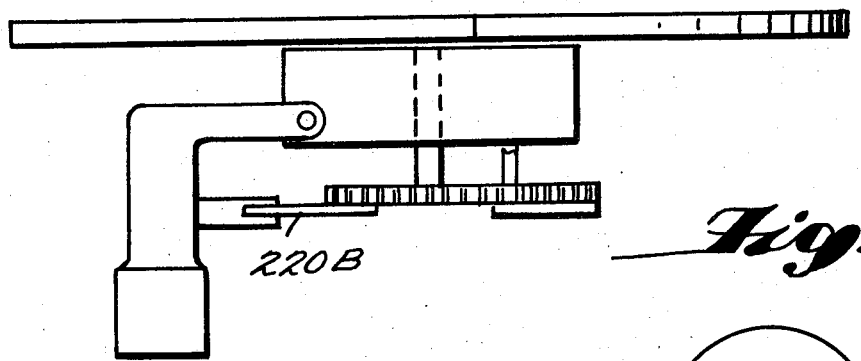
FIG. 13 is a sectional view similar to FIG. 12, again with certain elements removed to expose others.

The peeling device comprises two steel rotating cups 144, 145, the circular leading edge of each of which is ground to a razor sharp edge. These cups are easily removable for replacement and can be sharpened in the machine. For best results they should be made substantially to proportions shown in FIGS. 3–5. Each knife cup 144, 145 is a cone-like shallow cylinder made of hard steel sharpened to a razor sharp cutting edge mounted on outer ends of respective rotating shafts 146, 147, one with cutting edge toward and the other away from the shaft.

Knife 144 includes a disk element 148 fixed to shaft 146. It, is recessed, and has screw threads to receive screw 150. Member 152 is another disk, that fits firmly outside of knife cup 144 and is screwed firmly to member 148 with the screw 150. Member 154 is fixed to shaft 147. It is of the same design as member 152. Cup 145 is slid over 154. Member 156 is a washer fastened tight against cup 145 with a screw 158. These shafts 146, 147 are each carried in a small tube 160, 162, the inside diameter of which is slightly larger than the diameter of the respective shaft. At both ends of these tubes is a bearing 164 in which the shaft can rotate. Each shaft and tube in turn is carried in a bearing 166 that permits the tube to move freely through a vertical plane.

On the end of each tube 160, 162 nearest a rotary cutter 144, 145 is fixed a feeler wire 168, 170, the free end of which is positioned adjacent to the sharp edge of the rotary cutter.

Tubes 160, 162 are rotatable around the axis 172 by action of meshing gears 174, 176 and 178, 180 which in turn are actuated and positioned through hollow shaft linkage 182 that is in turn actuated by cam 186.

Worm gear member 188 is a housing to which is fixed cam follower 190 and in which are worm pinion gears 192 and 194 positioned by rods 196 and 198 respectively that are easily adjusted by the operator at the face of the machine while the machine is in motion. By turning handle 200, both tubes 182 and 184 can be rotated to a new position. At a certain position cams 202 and 186 operate to rotate plate 204 and tubes 182 and 184 in a definite differential. On plate 204 is mounted supporting frames 206 and 208 which carry tubes 160 and 162 respectively. When plate 204 is rotated by cam 202, this rotating movement also rotates cutters 144, 145 and their respective guides 168, 170 in unison around the same circular arc. The relative position of the guides to cutters being determined by the cam differential.

Guides 168 and 170 are rotated clockwise by rotation of tubes 160 and 162 to the required depth of cut set by position of worm gears 192 and 194. Slip joint 210 allows for overrun of the cam on large diameter fruit. In the meantime, rotary cutters 144, 145 have been set in motion by electric motor 212 rotating drive shaft 214, which in turn drives shafts 146 and 147 through O-ring belts 216 and 218. Plate 204 is rotated clockwise by cam 202 to carry the cutters 134 up to the buttons of the spiked fruit, then the tubes 160 and 162 are lifted away by action of cam 220 through rotating tube 222 and linkage 224.

If the fruit contains an elongated thick stem end, such as June bloom fruit, it is necessary to rotate tube 162 and guide 170 faster than guide 168 as the cutters move around the fruit to provide for a continuously deeper cut on one end than on the other. This is accomplished by positioning plate 230 or 232 by pulling or pushing rod 234 236 to the desired position. As cam 186 rotates box 188 in a clockwise manner, roller 238 will automatically reposition gear 192 without changing the position of gear 194. Either feeler can also be similarly repositioned by changing rod 234 or 236 to accommodate any irregular shaped fruit.

Two rotary cutters 144, 145 operating in opposed directions are used not only to speed up the operation but principally to exert force against the rotary spiked heads and thus hold the fruit on the spikes. Otherwise it is difficult to hold the fruit on the spiked buttons.

Another advantage in this machine is the ease of maintenance. Each plate 62 is the base of a removable head constructed so that it can easily be taken from the machine and replaced should a breakdown occur. The plate 204 is rotatably mounted on the sleeve bearing 66 of the plate 62 via an axle 240. To remove a head, raker arms 242, 244 and 246 for the three cams are disconnected at 248, 250, 252, air connections at 254, 256 and 258 are disconnected and snap joints 260, 262 and 264 are pulled apart. Then, upon removing the four bolts 266, the plate 62 and all of the parts mounted on it may be removed. (Couplings 268, 270 and 272 are slidably connected and disconnected.)

FIG. 7 is a plan view of the peeled fruit just after the knives 134 have cut off the knobs. A stainless steel pan 274 carried by an arm 276 and rotating around pivot 278 is controlled by one rotation arm 22 carrying fruit loading cup 20.

When the fruit is being peeled, the pan 274 is moving from over the belt from the position shown in dotted lines to the position shown in full lines. This allows the strips of peel being cut off by the rotating knives to fall into a conveyor (not shown) directly under the fruit. When pan 274 arrives at the full line position the fruit has been peeled, all the peel has fallen away, the knives 134 have cut off the knobs and the spikes have released the knobs allowing the fruit and knobs to fall into the pan.

The belt conveyor 138 is driven by and carried around rollers 280, 282. The rod 184 is about one-half inch in diameter, and is positioned to permit the buttons of fruit peel from the spiked members to pass under and fall inside of baffle 284, while the ball of fruit passes over the rod. The sloping condition in which pan 274 is carried on arm 276 is also shown. This permits the peeled fruit and knobs to slide out of the pan onto the belt.

In operating the machine, the operator sits at position shown in FIG. 1, turns on the switch which is directly in front of her in the face of the machine, and places a fruit in each lower cup 20, the stem and bud ends of the fruit are preferably (though not necessarily) in a horizontal position, the stems pointing towards each other. The cups are separated as indicated by the dashed lines in FIG. 2. Upon initiation of movement from the loading station, the cups are brought to their solid line position as the cam rollers 34 roll off the aforesaid high region of the cam surface 38. The cams immediately start rotating through action of their driving motor and move the fruit to the peeling station 14. As soon as the fruit reaches this position, cam action throws carrying arms 94 inwardly, spiking the fruit uniformly from both sides. Arms 22 are then swung back towards loading position slipping off of the fruit by relaxing of spring 26. As soon as the arms have moved away from the fruit, cam action starts the motor which rotates the fruit on the spike chucks and at the same time, pressure of the spiked disks against the fruit is relieved by action of air pressure cylinder 104.

Figure 14:
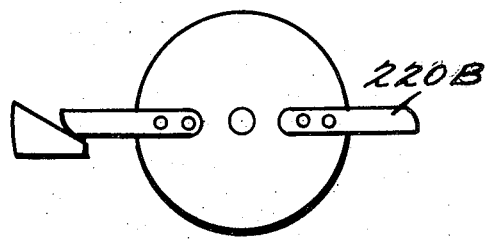
FIG. 14 is a front elevation view of a detail of FIG. 13.
Figure 12:
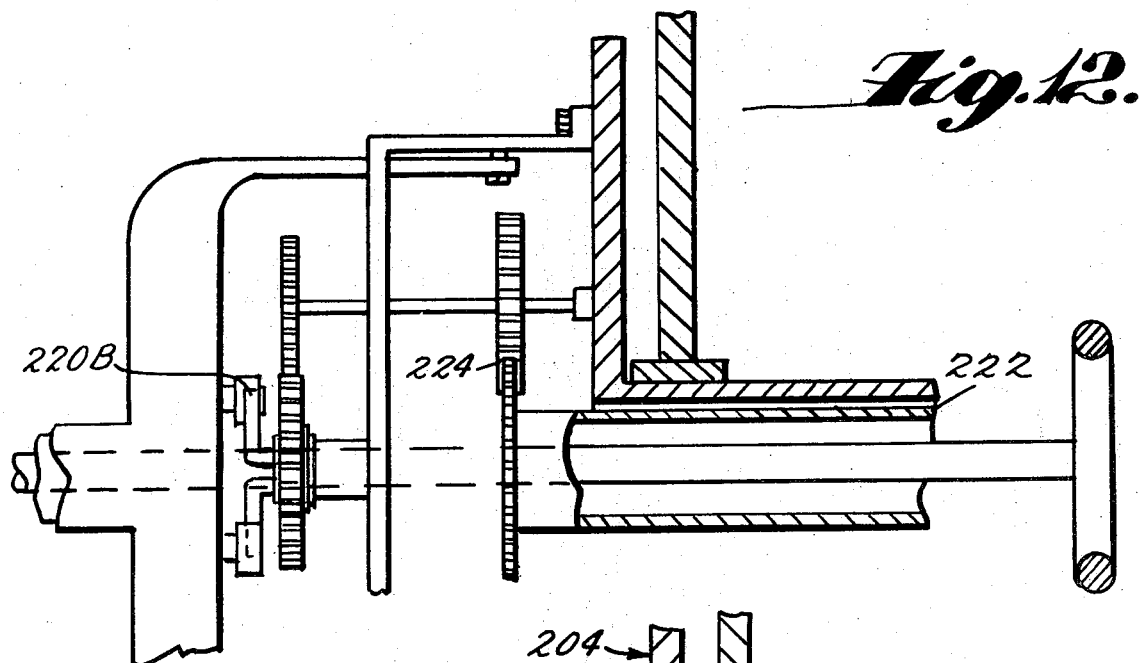
FIG. 12 is a sectional view similar to FIG. 11 with certain elements removed to expose others.
Figure 11:
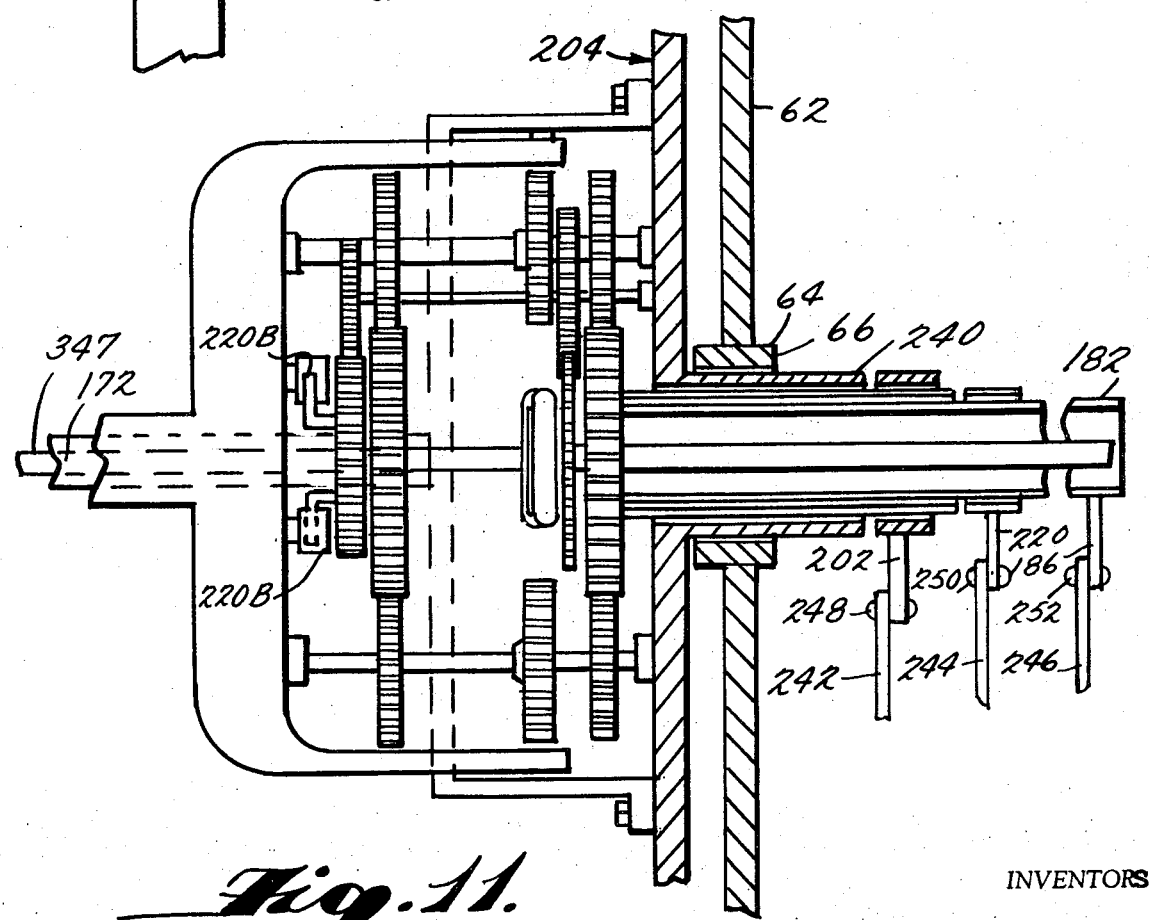
FIG. 11 is a vertical longitudinal sectional view of the head of FIG. 10 mounted on the machine.

The motors 212 which rotate the peeling knives 144, 145 turn on. Arms 160, 162 which have been held apart move together through action of cam 220 FIG. 12 and FIG. 14. When feelers 168, 170 touch the surface of the fruit, cam 186 turns tubes 160, 162 until the desired depth of cut is reached, then plate 204 begins to rotate through action of cam 202 moving the two knives around the fruit to a point where the knives are almost in contact with the spike chucks. Lips 168B and 170B prevent actual contact of the knives. Cam 220 then lifts the rotary cutters away from the fruit. As soon as they are out of the way, knives 134 are snapped across the end of the fruit through air action in cylinders 136 and cut off the knobs. All of the peel, which falls from the fruit in long strips, has now fallen out of the machine and pan 274 has been swung into full line position under the fruit. Both the fruit and knobs are delivered by the pan to dashed line position. While the peeled fruit and knobs roll from the pan onto the moving belt 138 and are carried from the machine, the knobs passing under rod 184 and the fruit passing over it, each into separate receptacles.

This cycle is repeated according to the speed setting of the motors.

An economical speed for a double head machine peeling oranges is 30 fruit per minute, when hand fed by one girl with one helper or trimmer. By hand peeling it takes an experienced girl 25 to 35 seconds to peel an orange, inexperienced help much longer.

While the machine is described being operated by mechanical cam action, other sources of movement can be used to accomplish the same results.

What is claimed is:

1. Apparatus for peeling at least one fruit of the group grapefruit and oranges comprising:
   a loading station including upwardly opening cup means configured to receive and support a fruit to be peeled;
   an arm means having one end mounting said cup means;
   an axle journalled for rotation about a generally vertical axis, said arm means having an opposite end secured to said axle, whereby upon rotation of said axle said cup means is transferred through a generally horizontal arc;
   a peeling station located at one end of said arc and including two diametrically opposed spike chucks having spike means protruding toward one another;
   means responsive to the diameter of the fruit for automatically vertically adjusting the spatial disposition of the cup to substantially center the fruit with respect to the spike chucks;
   means for thrusting said spike chuck spike means toward one another when a fruit has been rotated on said cup means to said one end of said arc to accept the fruit from the cup means to mount the fruit on the spike chucks in a substantially centered condition;
   means for rotating said spike chucks to effect rotation of the fruit mounted thereon;
   knife means movable along the periphery of the fruit at diametrically opposed sites, from adjacent one of the spike chucks to adjacent the other of the spike chucks for peeling the peel from the fruit; and
   means for cutting remaining buttons of peel from where the fruit is spiked by the spike chucks to complete peeling of the fruit and to sever the fruit from the spike chucks.

2. The apparatus of claim 1 further including pan means disposed beneath the spike chucks and adapted to catch the peeled fruit falling from the spike chucks upon severance of the peel buttons.

3. The apparatus of claim 2 further including means for rotating the pan means;
an endless belt conveyor;
said pan means being rotatable to cover the belt conveyor so that the peeled fruit may be dumped from the pan means and onto the conveyor for transit from the apparatus.

4. The apparatus of claim 1 wherein the spike means on each spike chuck comprises a circle of spikes;
a plunger mounted among said spikes;
means for reciprocating said plunger for forcing severed buttons of peel from said plunger.

5. The apparatus of claim 1 wherein said automatic vertical adjustment means includes a second cup means mounted in an inverted altitude above the first mentioned cup means;
wherein said arm means includes a parallelogram linkage for each cup means;
means coordination both parallelogram linkages so that when one moves toward the other by an amount, the other moves toward the one by a corresponding amount;
means normally resiliently urging the two parallelogram linkages toward one another;
cam means arranged to contact at least one of the parallelogram linkages when the cups are at the opposite end of said arc from said one end for biasing the two parallelogram linkages and cups away from one another so that a fruit to be peeled may be loaded between the cups.

6. The apparatus of claim 1 including a frame;
a belt conveyor centrally longitudinally mounted on the frame;
said loading station, peeling station, rotating means, automatically vertically adjusting means, knife means and cutting means being mounted on said frame on one side of said belt conveyor; and
a second loading station, a second peeling station, second rotating means, second automatically vertically adjusting means, second knife means and second cutting means all being substantially identical to their first mentioned counterparts, but being mounted on said frame on the opposite side of said conveyor belt; and
means for coordinating the first mentioned counterparts and the second mentioned counterparts of said apparatus, excepting the automatically vertically adjusting means.

7. The apparatus of claim 6 wherein each peeling station and the rotating means, automatically vertically adjusting means, knife means and cutting means associated therewith are mounted on turret means removably secured to said frame as a unit.

8. The apparatus of claim 1 further including depth setting means for varying the cutting depth of said knife means to accommodate the peeling of fruit of differing peel thickness.

9. The apparatus of claim 1 further including:
second, inverted cup means mounted above the first-mentioned cup means;
arm means mounting the second cup means with respect to said axle for coordinate horizontal arcuate movement with said first-mentioned cup means;
said first-mentioned and second cup means respectively being equispaced below and above the longitudinal axis of the spike chuck means; and
means for coordinately converging and diverging the two said cup means to permit loading and transferring of fruit to be peeled and to automatically center the fruit being loaded with respect to the spike chuck means regardless of variation in the diameter of the particular fruit.

10. The apparatus of claim 1 wherein the means for thrusting the spike chuck means includes means for relaxing thrusting force and for permitting rebounding of the fruit prior to initiation of peeling.

* * * * *